(Model.)
J. BOSHARDT.
ARTIFICIAL FLOWER.
No. 245,772. Patented Aug. 16, 1881.
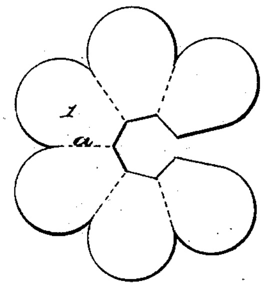
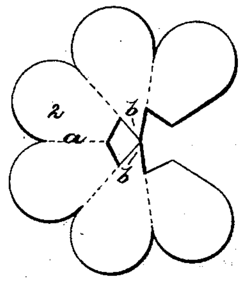
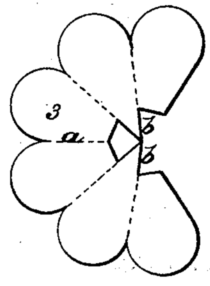
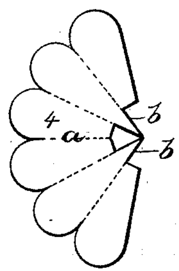
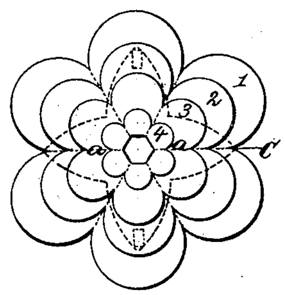
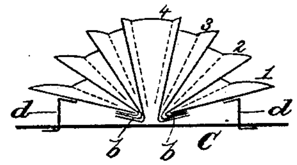
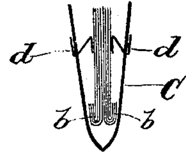
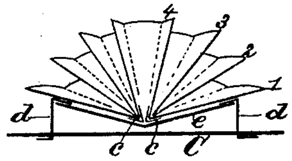
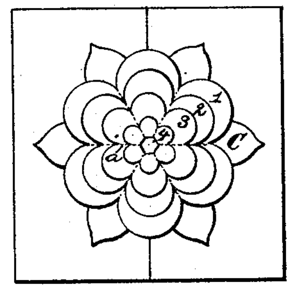
Witnesses.
Robert Everett.
Jos. S. Coombs
Inventor.
Julius Boshardt,
By J. J. Coombs, Atty.
N. PETERS. Photo-Lithographer. Washington, D. C.

UNITED STATES PATENT OFFICE.

JULIUS BOSHARDT, OF BERLIN, GERMANY, ASSIGNOR TO WOLF HAGELBERG, OF SAME PLACE.

ARTIFICIAL FLOWER.

SPECIFICATION forming part of Letters Patent No. 245,772, dated August 16, 1881.

Application filed May 13, 1881. (Model.)

*To all whom it may concern:*

Be it known that I, JULIUS BOSHARDT, of Berlin, in the Kingdom of Prussia, Germany, have invented a certain new and useful Improvement in the Manufacture of Artificial Flowers; and I do hereby declare the following to be a full, clear, and exact description of the invention.

In the manufacture of artificial flowers as heretofore practiced the petals have been cut separately from webs, paper, or other suitable fabrics, in shapes to correspond as nearly as practicable to the form of petals in natural flowers; then the leaflets are disposed one by one around a core, according to the blossom shape desired. This process is comparatively expensive, requiring much time, and, besides, a flower thus constructed will necessarily be very fragile because of the slight hold the single petals will have. This last-mentioned defect is especially felt when the flowers are to be exported for sale in transmarine countries, or transported long distances, as in such cases the flowers can only be preserved from injury by forwarding them in bulky packings, greatly increasing the cost of transportation over what it would be if they could be compactly packed.

The object of my invention is to overcome these defects, as well as to construct artificial flowers which may be applied to an increased variety of uses.

I now proceed to describe my process or method of manufacturing artificial flowers so as to obviate the above-mentioned defects.

Of woven fabrics, paper, or other suitable stuffs I cut, by means of stamping-machines, circular or part-circular disks to the number of corollas wanted in the flower, each disk having a sector-shaped opening in it of varying widths, as shown in Figures 1, 2, 3, and 4 of the drawings hereto annexed. In said drawings four corollas only are represented; but the number may be increased as desired.

Fig. 1 represents the outside corolla, which is nearly a complete circular disk. Fig. 2 represents the next inner corolla, with a wider sector-shaped opening; Fig. 3, the next corolla, with a still wider opening; and Fig. 4, the extreme inner corolla in a nearly semicircular form. Each of said disks is to be so bent that the sector-edges will meet and slightly lap, when they are to be cemented together by any suitable mucilage. This brings each disk into a conical or bell-shaped form, with a regularly-increasing acuteness of angle of the periphery to the axis.

As a rule, an even number of petals should be represented by the scallops in each disk, so that when the flower is folded two of the short lines between the petals will come directly opposite each other, so that the flower may be folded on said short lines, which I regard as preferable, though not absolutely necessary. These lines are indicated in the drawings by dots *a a*; but the fabric is not to be severed on said lines. The corollas thus brought into conical form are, in regular order from 1 to 4, put into each other, and may be secured to each other at their central portions by mucilage or in any other suitable way; but in putting them together it is well that care be taken that in the line on which the flower is to be folded the notches to represent separate petals in all the corollas coincide or fall in the same plane. Thus an artificial flower is produced which may be folded on a line passing through its center without danger of serious injury. By this method each disk is made to constitute a consistent concrete corolla, the single corollas varying in size and inclination, so that the corolla of disk 1 shows the largest petals, standing most flatly, and that of disk 4 the smallest, standing the most steeply.

In order that the disks may be bent into conical form, as described, it is necessary that their centers be cut out, as shown in Figs. 1, 2, 3, and 4; but the construction of the flower will be facilitated by so cutting the petals that two opposite ones will have points running to the center, as shown at *b* in Figs. 2, 3, and 4, and bending said points around the inner rim of corolla 1, as shown in Figs. 6 and 7, in such manner that the fastenings during the bending movement cannot be distorted.

In the annexed drawings, Figs. 5 and 6 represent views of the flower made of disks 1 to 4, inclusive, in accordance with the process above described. Fig. 7 shows the flower in the shape it assumes after having been folded for packing. It will be seen by these figures that the petals, when exclusively fastened by the little projecting points *b*, are freely movable, so as to easily conform to the folding movement. Fig. 8 shows another alternative mode of fastening the corollas which may be used. In this case two tapes, *c c*, are bent around the inner edges of the inner and outer corollas, as shown in said Fig. 8, and cemented thereto.

As the calyx or base C is always made of stouter and stiffer material than the corollas or petals, I secure the outer corolla to the calyx or base on opposite sides by tapes *d d*, having sufficient slack between the corolla and the calyx or base to cause the flowers to be opened when the calyx or base is spread open, as shown in Figs. 6 and 8. The ends of these tapes may be secured to the corolla and the calyx by cement, as shown in Fig. 6; or a strip of strong paper, *e*, may be pasted across the back of the outer corolla and the ends of the tapes secured between said paper strip and the corolla, as shown in Fig. 8. The corollas should be so cemented together on the sides to which the tapes are attached, but at points near their centers, that the opening of the outer corolla will spread the inner corollas sufficiently to give the flower a natural shape.

When a flower is set upon a star of leaves, the calyx C standing alone, and the flower fastened upon that base by means of two small tapes, it admits of being closed and opened by folding and unfolding the calyx, so that the flower, when not in use, may be put away and kept in a closed state. When the flower, by unfolding the calyx, is opened, only a few stitches are required to connect the projecting points of the calyx C with the stuffs serving as a base, in order to have the flower, when opened, firmly remain in that position.

I further mention that the method of manufacture described allows artificial flowers to be applied for ornamenting cards, tickets, &c., as used in social life, as illustrated in Fig. 9.

What I claim as my invention, and desire to secure by Letters Patent, is—

1. An artificial flower composed of several concrete conical corollas, formed by cutting out disks with sector-shaped openings and cementing the sector-edges together, substantially as described.

2. In an artificial flower composed of several concrete conical corollas, adapted to be folded as described, the tapes *d d*, connecting the outer corolla with the calyx or base, so that when folded the opening of the calyx or base will spread open the flower, substantially as described.

3. In an artificial flower composed of several concrete conical corollas, as described, the points *b b* on the inner corollas, substantially as and for the purpose described.

4. In an artificial flower composed of several concrete conical corollas, as described, the tapes *c c*, connecting the series of corollas together, substantially as described.

In testimony that I claim the foregoing I have hereunto set my hand this 6th day of April, 1881.

JULIUS BOSHARDT.

Witnesses:
BERTHOLD ROI,
LEOPOLD PUTZRATH.